(12) United States Patent
Duncan et al.

(10) Patent No.: US 7,107,533 B2
(45) Date of Patent: Sep. 12, 2006

(54) ELECTRONIC BOOK WITH MULTIMODE I/O

(75) Inventors: Brandon Duncan, San Jose, CA (US); Joshua Seth Hodas, Claremont, CA (US); Jared Joseph Jackson, San Jose, CA (US); Walter Irwin Nissen, III, Livermore, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/829,249

(22) Filed: Apr. 9, 2001

(65) Prior Publication Data
US 2003/0013073 A1    Jan. 16, 2003

(51) Int. Cl.
*G06F 3/00* (2006.01)
*G06F 9/00* (2006.01)
*G06F 15/00* (2006.01)
*G06F 17/00* (2006.01)
*G10L 21/00* (2006.01)

(52) U.S. Cl. .................... 715/727; 715/500.1; 704/270

(58) Field of Classification Search ............... 345/727, 345/729, 728, 901, 776; 704/272, 270, 275; 715/500.1, 864, 865, 978
See application file for complete search history.

(56) References Cited

U.S. PATENT DOCUMENTS

| | | | |
|---|---|---|---|
| 5,606,702 A * | 2/1997 | Diel et al. ................... | 709/329 |
| 5,777,614 A * | 7/1998 | Ando et al. ................. | 345/729 |
| 5,914,707 A * | 6/1999 | Kono .......................... | 345/173 |
| 6,438,523 B1 * | 8/2002 | Oberteuffer et al. ........ | 704/270 |
| 6,538,666 B1 * | 3/2003 | Ozawa et al. ............... | 345/728 |

OTHER PUBLICATIONS

NOVeLLA: A Multi-Modal Electronic-Book Reader With Visual and Auditory Interfaces. Joshua S. Hodas et al. International Journal of Speech Technology 4,pp. 269-284, Apr. 6, 2001.
NOVeLLA: A Multimodal Reader for Open eBooks. Rescherche d'Informations Assistee par Odinateur (RIAO) Conference, Applications vol. 3, pp. 23-24, 2000.

* cited by examiner

*Primary Examiner*—John Cabeca
*Assistant Examiner*—Blaine Basom
(74) *Attorney, Agent, or Firm*—John L. Rogitz

(57) ABSTRACT

An electronic book device runs at least two output mode threads—one graphics, and one audio—such that the device can both graphically display book content, and play the content over a speaker in the device. Annotations can be made audibly or graphically, and user commands can likewise be made audibly or graphically.

19 Claims, 4 Drawing Sheets

OPERATION

ELEC BOOK DEVICE

OVERALL ARCHITECTURE

MAIN WINDOW

SET UP

OPERATION

EXEMPLARY DETAILED ARCHITECTURE

ELECTRONIC BOOK WITH MULTIMODE I/O

BACKGROUND OF THE INVENTION

1. Field of the Invention

The present invention relates generally to electronic books.

2. Description of the Related Art

Replacing paper books with electronic devices enables more compact storage and ease of access to written information. For instance, a single small electronic device can store many books, including books that might be downloaded instantaneously at any time via the Internet. Further, electronic books can be backed up, so that physical damage to the device does not necessarily correspond to a loss of content. Additionally, many electronic books provide the capability of annotating the displayed content as desired. Even further, to accommodate sight-impaired readers, some electronic books audibly display content using synthesized speech.

Unfortunately, existing electronic book devices do not fully exploit many of the advantages they might otherwise. For instance, while some books might audibly display content, they do not provide a reciprocal means for accepting non-written input from the visually impaired user. Further, electronic devices that are configured for playing synthesized speech typically do not also provide a visual display as a convenience for sighted users, and vice-versa. Not surprisingly, since existing electronic book devices are single mode, no capability has been provided to manage and coordinate plural modes of input and output. Still further, as recognized herein visually impaired users could be accommodated by providing the capability to resize text without requiring the user to wait until a large print version of the book is published, but unfortunately this is not routinely done. In any case, existing electronic book devices are simply not as useful to certain users as they might otherwise be. The present invention has carefully considered the above problems and has provided the solutions to one or more of them as set forth herein.

SUMMARY OF THE INVENTION

A preferred, non-limiting embodiment of the present electronic book device works across a variety of modes of input and output. It manages plural modes and coordinates the efforts of I/O for consistency. Moreover, the invention can extend these capabilities to user-generated annotations, such that the device can be used by disabled users and non-disabled users.

Accordingly, an electronic book device includes a portable housing and a processor in the housing. Content stored in a storage device is displayed in plural output modes, and the processor can respond to plural input modes.

The preferred output modes can include visual graphics and sound. Accordingly, the device can include a visual display and an audio speaker, both being responsive to the processor for outputting content. The processor is responsive to user input using one or more input modes to select an output mode. The input modes include graphics and sound, and the device includes a graphics input device and an audio input device, both sending input signals to the processor. As set forth in greater detail below, the processor is responsive to user input to select an input mode.

Preferably, the processor responds to a graphics input mode by outputting content in a graphics output mode using a graphic user interface. The processor also responds to an audio input mode by outputting content in an audio output mode using an audio user interface. The user interfaces run simultaneously with each other. Moreover, the processor can receive for storage annotations from a user-selected one of the user interfaces and updates the other user interface accordingly Also, the processor is programmed to allow a user to navigate through the content using a user-selected one of the user interfaces and to update the other interface with the navigation result.

In another aspect, an electronic book includes content stored in a data storage, an abstract interface accessing the data storage, and an audio user interface communicating with the abstract interface. Also, the book includes a graphics user interface communicating with the abstract interface. The abstract interface receives user input commands from the audio user interface and updates the graphics user interface in response thereto. Likewise, the abstract interface receives user input commands from the graphics user interface and updates the audio user interface in response thereto.

In still another aspect, a computer program product includes a computer program storage device and computer-readable instructions on the storage device for causing a computer to display electronic content in more than one mode. The product includes computer readable code means for receiving an annotation to content via an audio user interface, and computer readable code means for associating the annotation with content. Computer readable code means display the annotation and associated content using a graphical user interface.

In yet another aspect, a method for presenting content using an electronic book includes providing a portable housing having content electronically stored therein. The method also includes running a first output thread that is useful for displaying the content, and, simultaneously with running the first output thread, running at least a second output thread useful for displaying the content.

In one preferred embodiment, the first output thread is a graphics output thread and the second output thread is an audio output thread. The threads are run simultaneously with each other such that each thread is at substantially the same location in the content as the other thread. Each output thread can be associated with a corresponding input mode for inputting annotations and user commands The method also includes responding to user commands to switch between displaying the content from the first output thread and displaying the content from the second output thread.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
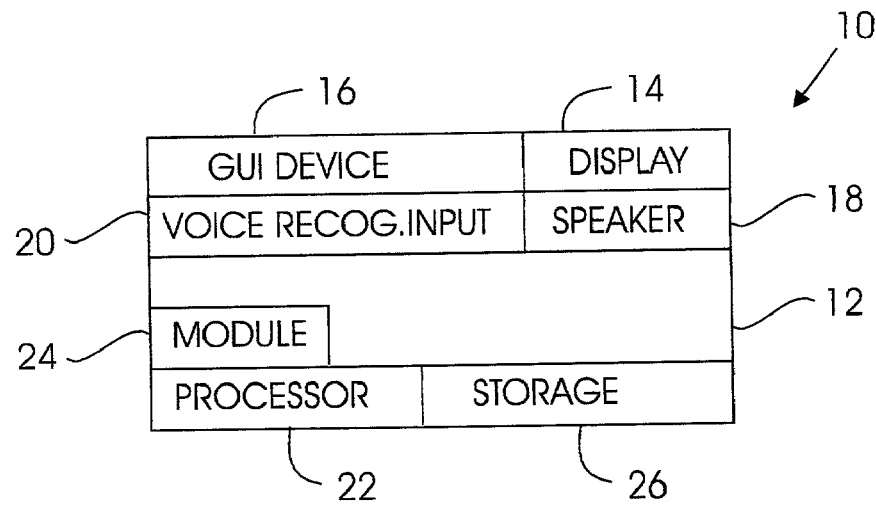
FIG. 1 is a schematic diagram of the electronic book.

Referring initially to FIG. 1, an electronic book device is shown, generally designated 10, that includes a portable housing 12 and a visual display 14 on the housing 12. The display 14 can be a matrix display, touch screen display, or any other visual display device. The display 14 essentially establishes a first output device that has a corresponding first input device, depicted in FIG. 1 as a graphics user interface (GUI) device 16. The GUI 16 can be established by the display 14 itself when the display 14 is a touch screen display, or by any other suitable input device, such as a keyboard or keypad, mouse, tablet with writing stylus, etc. In any case, provision is made for both input and output using a graphics device, such as but not limited to tablets, touch screen displays, etc.

In addition to the output device established by the display 14, the book 10 includes a second output device. The second output device can be, e.g., an audio speaker 18, or braille device, or other device A second input device, such as an audio user interface (AUI) such as a voice recognition module 20 that includes a microphone on the housing 12, is associated with the speaker 18. Additional input/output device pairs in modes other than audio and graphics can be provided in accordance with present principles.

As shown in FIG. 1, a microprocessor 22 resides within the housing 12 and accesses a software, firmware, or hardware module 24 to execute the logic set forth herein to present, in a user-selected one of at least two modes, content that is stored in a data storage 26 in the housing 12. Alternatively, the storage 26 can be remote from the housing 12 and linked to the microprocessor 22 via wired or wireless connection. The microprocessor 22 presents content in graphics form on the display 14 and/or displays content in audio form by playing the content over the speaker 18. Accordingly, the microprocessor 22 accesses the module 24 to undertake the logic of the present invention, which is executed by the microprocessor 22 as a series of computer-executable instructions. The instructions may be contained on a data storage device with a computer readable medium, having a computer usable medium with code elements stored thereon. Or, the instructions may be stored on random access memory (RAM), on a DASD array, or on magnetic tape, conventional hard disk drive, electronic read-only memory, optical storage device, or other appropriate data storage device The following description and pseudo-code herein illustrate the structure of the logic of the present invention as embodied in computer program software. Those skilled in the art will appreciate that these descriptions illustrate the structures of computer program code elements, including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown. In an exemplary embodiment, the instructions may be written in JAVA 1.3 or JAVA 2.

Figure 2:
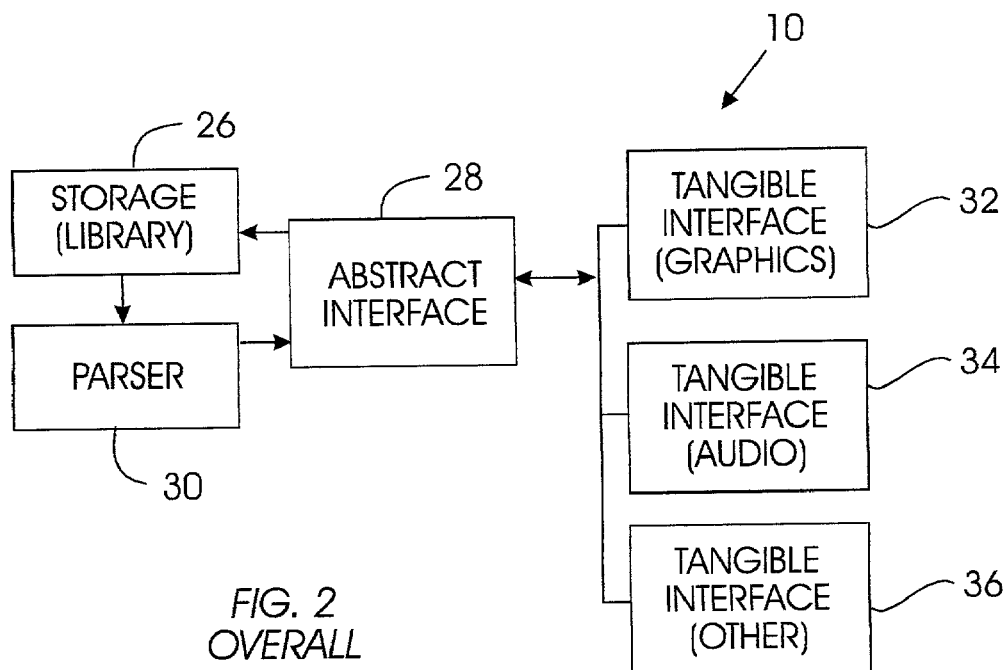
FIG. 2 is a block diagram showing the architecture of the present invention.

FIG. 2 shows the software architecture of the book 10. As shown, an abstract interface 28 accesses the storage 26, which stores one or more books in electronic form. In one preferred, non-limiting example, a book can be stored across a number of files that contain the actual text content of the book stored as XML files for each chapter or other unit, while some files hold graphics and other inserts as in typical HTML documents. In addition to these files, each book has a package file. This file contains an XML specification of metadata containing information such as the name of the author, the publisher, the date of publication, and the type of book. In addition, the package file contains a complete manifest of the files that make up the electronic book, and a list of the linear order in which the book should be presented. The file optionally defines alternative nonlinear navigation paths through the files of the book. A sample of such a file follows:

```
<?xml version="1.0"?>
<!--
        Taken from Test Suite for the Open eBook document version 1.0
        Author:    Garret Wilson <garret@globalmentor.com>
-->
<!DOCTYPE package PUBLIC "+//ISBN 0-9673008-1-9//DTD OEB 1.0 Package//EN"
"oebpkg1.dtd">
<package unique-identifier="oeb10testsuite">
    <metadata>
        <dc-metadata>
                <dc:Title>Open eBook 1.0 Test Suite</dc:Title>
                <dc:Creator role="aut" file-as="Wilson, Garret">Garret Wilson</dc:Creator>
                <dc:Creator role="spn">GlobalMentor, Inc.</dc:Creator>
                <dc:Rights>Copyright © 1999 Garret Wilson, GlobalMentor, IncY</dc:Rights>
                <dc:Description>Test suite for validating the OEB spec.</dc:Description>
                .
                .
                .
        </dc-metadata>
    </metadata>
    <manifest>
        <!-- OEB Documents-->
            <item id="foreword" href="foreword.html" media-type="text/x-oeb1-document" />
            <item id="headings" href="headings.html" media-type="text/x-oeb1-document" />
                .
                .
                .
        <!-- PNG Images -->
            <item id="mandelbrot.png" href="mandelbrot.png" media-type="image/png" />
```

-continued

```
        .
        .
        .
    </manifest>
    <spine>
        <itemref idref="foreword" />
        <itemref idref="headings" />
        .
        .
        .
    </spine>
    <tours>
        <tour id="alphatour" title="Alphabetical Tour of Element" >
                <site title="Element <a>" href="links.html#a" />
                <site title="Element <area>" href="images.html#area"/>
            .
            .
            .
        </tour>
    </tours>
    <guide>
        <reference type="toc" title="Table of Contents" href="toc.html" />
        <reference type="foreword" title="Foreword" href="foreword.html" />
    </guide>
</package>
```

The storage 26 in turn cooperates with a parser 30, which sends portions of content stored in the storage 26 to the abstract interface 28. In one preferred, non-limiting implementation, the parser 30 parses each book's package file and stores the metadata into an object representing the book. The package files (and all other XML files handled by the system) can be parsed using the Document Object Model (DOM) and Simple API for XML (SAX) standards. In one particularly preferred embodiment, IBM's XML4J 2.0.15 parser is used.

In accordance with the present invention, the abstract interface 28 manages and coordinates plural tangible interfaces. In the embodiment shown, the tangible interfaces include a graphics interface 32 and an audio interface 34. Other tangible interfaces 36 can be provided. It is to be understood that the graphics interface 32 includes software that outputs content on the display 14 and that receives user commands via the GUI device 16. Likewise, the audio interface 34 includes software that outputs content by playing the content via the speaker 18 and that receives user commands via the AUI that is established by the voice recognition module 20. The tangible interfaces 32, 34, 36 can each be a combined input/output interface or a pair of an input-only interface and output-only interface. In any event, each tangible interface 32, 34, 36 can communicate continuously with the abstract interface 28 and query the abstract interface 28 for positional information relative to the content being rendered.

In light of this, for each tangible interface 32, 34, 36, the abstract interface 28 stores information such as the current position in the content being rendered and/or a spanning region of the content being rendered (e.g., the start and end position of a page of text being displayed). Thus, by means of the abstract interface 28, first and second output threads are essentially being run simultaneously with each other As a consequence, actual output might be undertaken using only one output device (display 14 or audio speaker 18) at a time, depending on user preference, but it might also be undertaken in plural modes simultaneously, i.e., by displaying the content simultaneously on both the display 14 and speaker 18. To this end, the abstract interface 28 also determines positions at which tangible interfaces should pause when required to coordinate the multiple output modes.

In addition, the tangible interfaces 32, 34, 36 communicate user commands such as positional changes (to, e.g., change the page being displayed, or skip to the end of the book, etc.) as well as user annotations and mode changes. The annotations are associated with user-selected portions of content for subsequent display of the annotations with the associated content. Thus, for example, a user might use the GUI device 16 to make an annotation in a page of a book being rendered, and if that page is subsequently played back in an alternate mode (e.g., audio), the annotation would also be rendered with the page in the alternate mode. Moreover, the user can change modes of display by speaking appropriate commands into the voice recognition device 20 or writing appropriate commands using the GUI device 16, as described more fully below.

Figure 3:
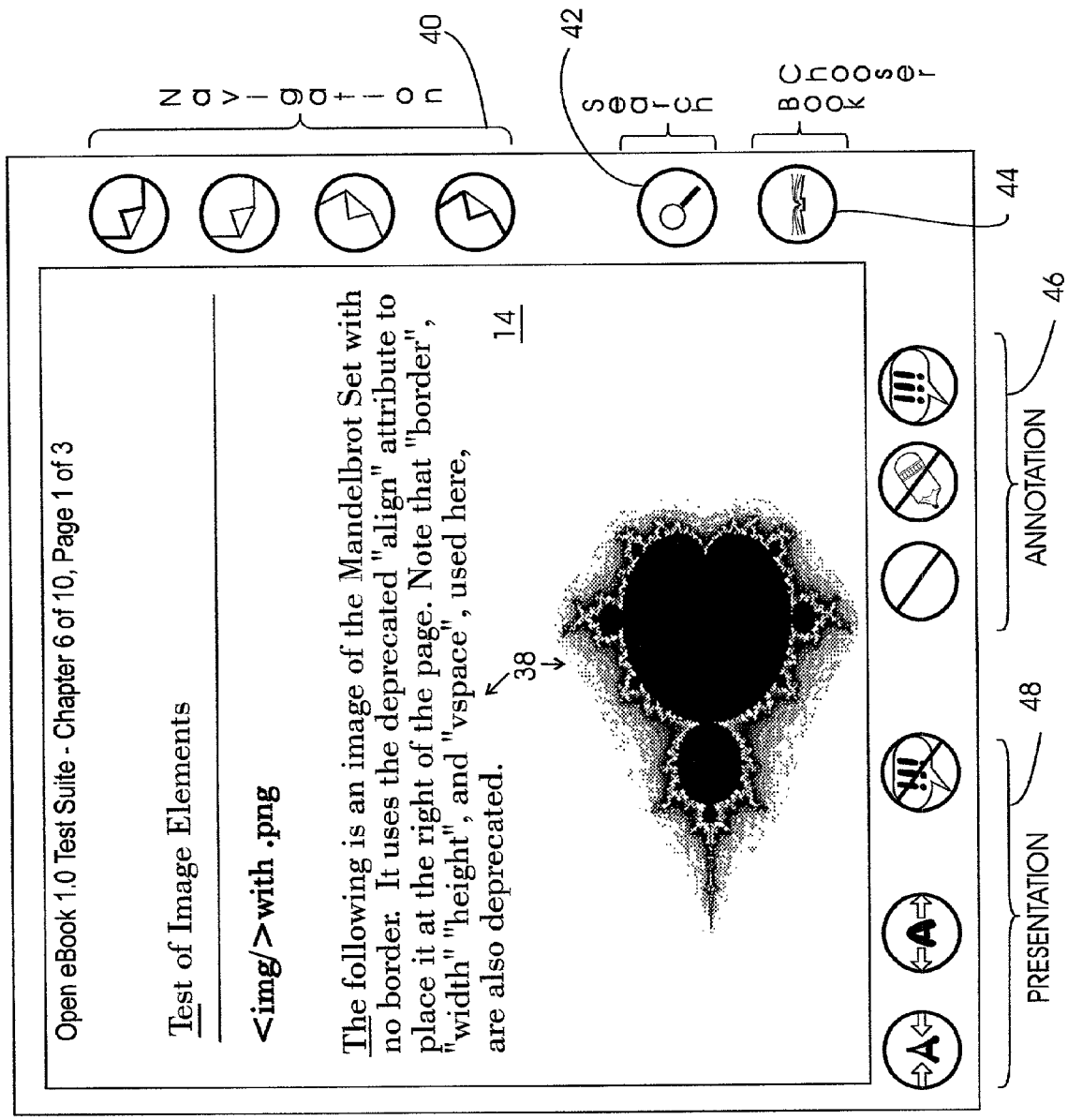
FIG. 3 is a diagram of the main window display on the book.

Further details of preferred user commands can be appreciated in reference to FIG. 3. It is to be understood that while FIG. 3 illustrates certain graphics-related ways to input commands, the same commands can be input using the voice recognition module 20, which has a vocabulary for recognizing the commands.

As shown, the display 14 can display graphics content 38, including text. Also, command input buttons can be provided on the display 14 when it is a touch-screen display. The buttons could alternatively be hardware-implemented buttons on a tablet. In any case, the buttons discussed below communicate signals to the graphics interface 32 and thence to the abstract interface 28.

In one preferred embodiment, the command buttons include navigation buttons 40 that can be used to change pages or navigate up or down a single page, go to the end or start of the book, and so on. Also, the command buttons can include a search button 42 that can be toggled to cause the below-mentioned book chooser to display a list of books stored in the storage 26, and a select button 44 that can be toggled to select a book in the list Additionally, the command buttons can include annotation buttons 46 that can be used to make and erase annotations, with an annotation being associated with the content over which the annotation has been made.

Still further, presentation mode buttons 48 can be provided to instruct the abstract interface 28 to display the content in both graphics and audio modes, or only graphics mode, or only audio mode. For instance, clicking a "read" button signals the system to begin reading the current page from the beginning, and clicking the "read" button again pauses the recitation. If the button is clicked a third time while the user is viewing the same page on the display 14, recitation resumes where it left off. When the system reaches the end of the text of the current page, it automatically advances the viewer to the next page (loading the next chapter, if necessary) and continues speaking.

Recitation can also be toggled using voice commands such as "Begin speak" and "stop speak". Whether the toggle is invoked by a click or a voice command, the visual state of the button is always updated appropriately. The presentation buttons can also control the size of the fonts used to display the text in the display 14.

Figure 4:
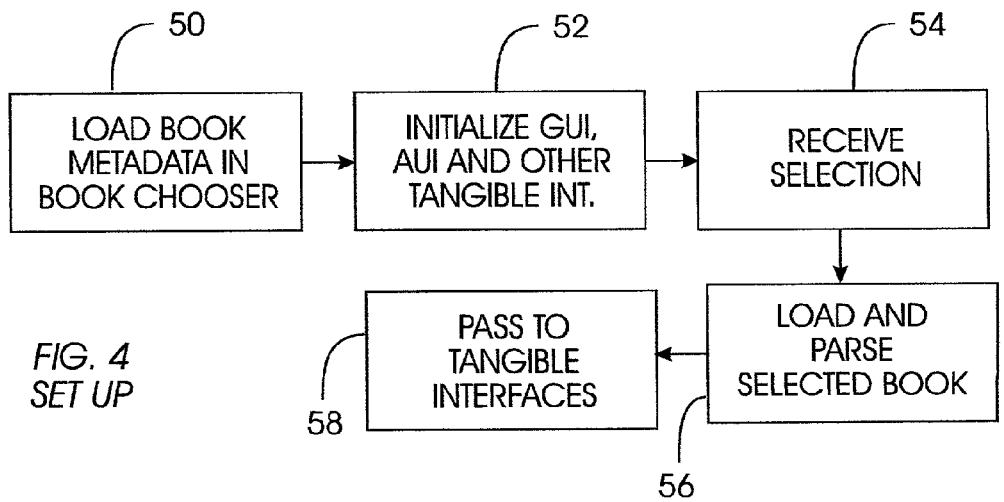
FIG. 4 is a flow chart showing the set up logic.

FIG. 4 shows the logic for setting up the book 10. Commencing at block 50, book metadata is loaded into a software-implemented book chooser. All tangible interfaces are initialized at block 52, and then the user's selection, either by means of the select button 44 or by receiving an audio command such as "select" from the voice recognition device 20, is received at block 54. Specifically, the book chooser parses the metadata contained in the book files and presents the user with a list containing book titles and author names. The user can navigate the list using speech commands such as "UP" and "DOWN" to move the selection highlight, and "SELECT" to open the document. The user can also move the highlight simply by speaking the title of the book the user wishes to select. The audio interface 34 will recognize the name and move the highlight to that title. The selected book is loaded and parsed by the parser 30, and then passed by the abstract interface 28 to the tangible interfaces 32, 34, 36 for display in one or more output modes.

Figure 5:
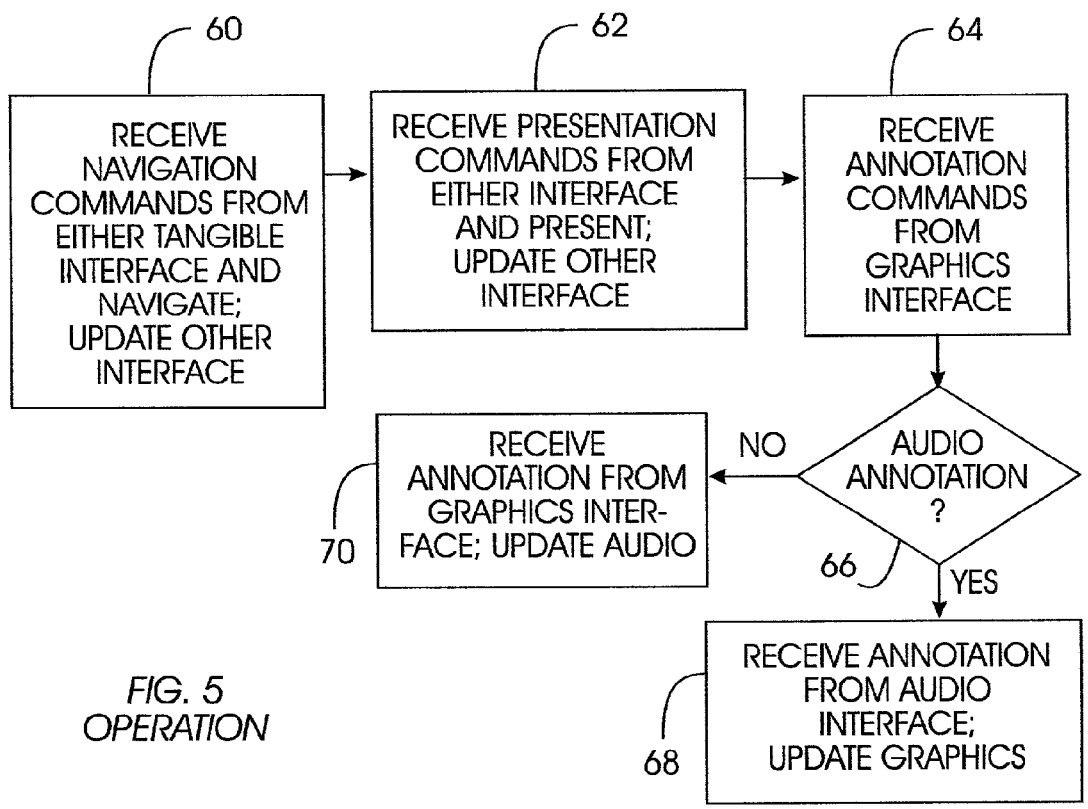
FIG. 5 is a flow chart showing the operational logic.

FIG. 5 illustrates, in flow chart form, some of the functionality discussed above. Commencing at block 60, navigation commands are received from one or more of the tangible interfaces 32, 34, 36. For instance, when the user speaks a command that is recognized as a navigation command by the audio interface 34, the audio interface 34 communicates the command to the abstract interface 28 for processing. The abstract interface 28 then updates the other tangible interface accordingly.

Also, at block 62 presentation commands are received from either one or both of the tangible interfaces 32, 34. The commands are processed by the abstract interface 28, which updates the other interfaces as required. In this way, the graphics thread and audio thread are kept coordictaed with each other. Moreover, at block 64 annotations are received graphically (as the user writes across a tablet or other GUI established by the GUI device 16), or as the user speaks a command such as "annotate" followed by a spoken annotation.

In one preferred embodiment, to create an annotation the user simply clicks on or drags over the text to be annotated. The three annotation buttons 46 control which type of annotation is created by this action. Each type of annotation is represented by a different mark in the text window displayed on the display 14. In highlight mode, which is the initial setting (and which can be reselected by clicking on the leftmost annotation button 46), dragging across a block of text places a yellow background behind the selected text. The highlight can be removed by clicking anywhere in the highlighted block. Clicking on the middle annotation button 46 puts the system into text-note mode. In this mode, clicking on a position in the text causes a dialog box to open into which the user can type some text. When the box is closed, a green underscore at the position the user clicked indicates the presence of the annotation. Subsequent clicking on the mark causes the note box to reopen, displaying the text of the annotation. When the box is displayed, the user can also choose to dictate the annotation rather than type it. Last, clicking on the rightmost annotation button 46 puts the system in audio-note mode. In this mode, clicking on a position in the text opens a box in which an audio annotation (that is, a stream of uninterpreted digitized audio) can be recorded. Recording is started by clicking on the record button, or saying, "begin recording". For reasons explained below in the implementation section, recording can only be terminated by clicking on the stop button; no voice command can be used for this purpose. The presence of an audio annotation is indicated by a red underscore beneath that position in the text. As with text-notes, clicking on the marked spot causes the annotation window to reopen so that the recording can be replayed, replaced, or deleted.

Decision diamond 66 simply indicates that when the annotation is made audibly, at block 68 the annotation is received and stored by associating it with the portion of the content being displayed. The graphics interface 32 is then updated. On the other hand, when the annotation is received using the GUI 16, the annotation is passed from the graphics interface 32 to the abstract interface 28 for storage and association, and the audio interface 34 is updated accordingly at block 70.

Figure 6:
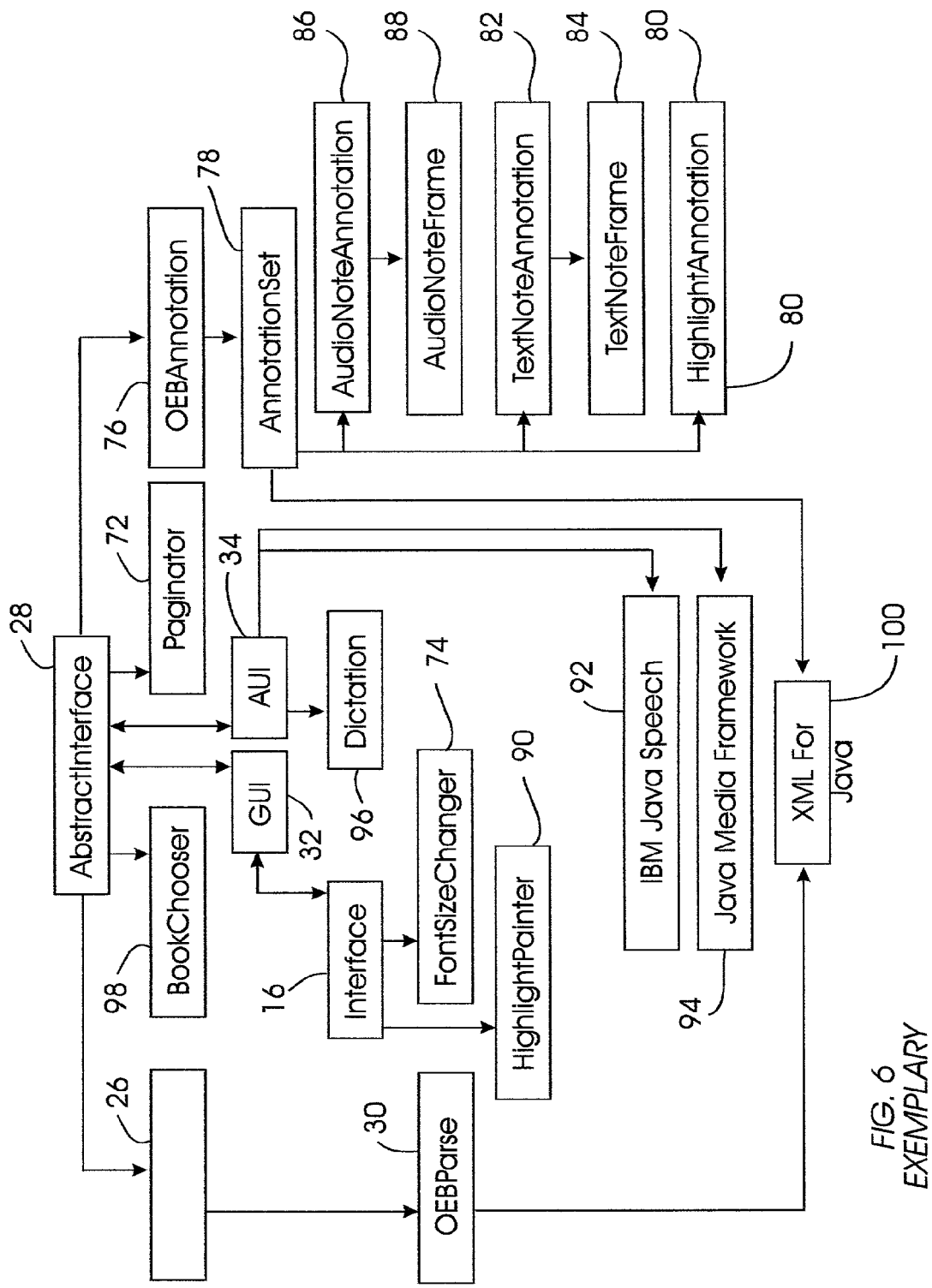
FIG. 6 is a block diagram showing the detailed architecture of one particularly preferred embodiment.

FIG. 6 shows a preferred, non-limiting architecture that uses open standards and off-the-shelf technologies to the greatest extent possible, to leverage these technologies to reduce implementation time while ensuring that the resulting system would not be tied too tightly to any one platform. The class structure and method architecture shown in FIG. 6 can be specified and maintained using the Unified Modeling Language (UML).

In the exemplary embodiment shown in FIG. 6, the graphics interface 32 preferably incorporates a reader such as a reader known as "JEditorPane" Swing component that supports HTML 3.2 and a subset of level one of the CSS standard, with the abstract interface 28 communicating therewith. In this regard, it is to be understood that while books can be thought of as XML files, the tag set used is essentially that of HTML 4.0 and level one CSS. Use of the above-mentioned reader facilitates the use of off-the-shelf software without having to write a new HTML renderer.

As recognized herein, it is desirable that electronic book readers present documents in the familiar page-by-page manner. Accordingly, the abstract interface 28 communicates with a paginator 72, which is a class that is responsible for pre-rendering a chapter file, determining where to place page breaks, and dividing the document at these points. Since changing the font size used in the viewer changes the amount of text that can appear on screen at one time, the paginator 72 can function dynamically at any time. The paginator 72 first renders the chapter off-screen in a single scrolling JEditorPane that is sized to the dimensions of the displayed pages. The paginator 72 then steps through the content of the chapter, finding the cutoff position for page breaks. This is accomplished by finding the character offset of the final character displayed in full in the off-screen buffer, then advancing the following line to the top of the buffer and repeating the process until the entire chapter has been examined. It stores the resulting character offsets in an array Once the page breaks have been determined, the system fragments the scrolling, off-screen pane into a series of page panes. This can require the creation of new JEditorPane, and the entire chapter file can be re-parsed for each page of the chapter. Once the file is paginated, the JEditorPane holding the first page is displayed.

As understood herein, it is important that pagination occurs after the HTML has already been rendered to styled text. Otherwise, the paginator 72 would be forced to consider what tags were open at the point that it cuts off a page, close them for the current page, and reopen them on the next. In the case of complex tag structures, like tables, this could inappropriately change the appearance of the rendered output.

As mentioned above, the graphics interface 32 is associated with the GUI device 16 on the housing 12, with the GUI device 16 including provisions such as the presentation buttons 48 for changing the font size that is displayed. Accordingly, a FontSizeChanger 74 is provided because, as recognized herein, as a result of using the JEditorPane component as the renderer, the seemingly simple task of changing the size of the fonts used for display is unduly complex Accordingly, a new default CSS style sheet is applied to the JEditorPane, setting a new base font size and each other element as well. When changing the font size, the new style sheet is applied, and the paginator 72 is called to reflow the text and redisplay the pages. Since a new style sheet is generated on the fly for each font-size changing event, this technique does not rely on some fixed number of predefined style sheets.

To implement the above-described annotations in the exemplary architecture shown in FIG. 6, an Open Electronic Book (OEB) Annotation module 76 communicates with the abstract interface 28. To associate a location in the text being displayed to a location in the document when storing an annotation and thereby establish an annotation set 78, and then reversing the process when retrieving the annotation, character offsets are used to indicate annotation positions in the (rendered) text contained in a JEditorPane. Because these offsets are the values returned from JEditorPane text-selection events, they can be used directly as returned when the user selects a block of text to annotate The offsets are used in the same way to tell the JEditorPane where to put the highlights and annotation marks when displaying annotated text. These offsets, which are relative to the beginning of the chapter file, are stable with respect to changes of font size and other rendering characteristics.

In the architecture shown in FIG. 6, a customized XML schema is used to store annotations. An annotation file is broken into three subsections corresponding to the three types of annotations. A highlight 80 is represented by its starting and ending offset in the chapter text, and a text note 82 is stored as an offset location 84 together with a string containing the text of the note. These strings are Java-style, and so can contain arbitrary Unicode. An audio annotation 86 consists of the location 88 of the annotation and the name of the file containing the digitized audio. One annotation file is stored for each file in an OEB package. The annotation file's name is formed by appending the extension annotation to the underlying chapter file name. Whenever a chapter file is read, the corresponding annotation file, if it exists, is read as well. A sample annotation file is as follows:

```
<?xml version="1.0"?>
<annotation_set>
    <highlight_set>
        <highlight start="1301" end="2984"/>
    </highlight_set>
    <text_note_set>
        <text_note offset="66" text="Implementation details?"/>
    </text_note_set>
    <audio_note_set>
        <audio_note offset="13"
          path="file:/C:/oeb/RIAO2000/riao0.html"/>
    </audio_note_set>
</annotation_set>
```

In the current version of the system, highlights and annotations are implemented using the so-called HighlightPainter 90 provided by JEditorPane. While text and audio notes are denoted with green and red underline markings, these are actually implemented as narrow highlights, generated by a so-called HighlightPainter 90. Ordinary highlights are presented using the DefaultHighlightPainter with a light yellow color setting.

In continued reference to FIG. 6, the audio interface 34, which encompasses the speech-recognition based control interface, the speech-synthesis based ability to read the book aloud, and the ability to store digitized audio annotations, uses Java Speech API (JSAPI) 92 to implement speech recognition and synthesis. Digitized audio notes are implemented using Java Media Framework (JMF) 94. One preferred implementation of the Java Speech API is in the form of a set of Java objects which interface with a set of DLLs which in turn drive IBM's ViaVoice Millennium Edition, which is installed on the system.

The present invention recognizes that in some circumstances, it is desirable to limit the range of recognized terms to a pre-specified grammar to improve speaker-independent recognition considerably. Grammars, which are specified in the Java Speech Grammar Format (JSGF), are context free grammars augmented with rule names and public/private flags. They are read from a text file, though they can be modified directly using the JSAPI. Below is a part of a particularly preferred implementation of a main grammar file, including some of the rules that are in place when the main viewer window is active.

```
grammar bookbrowse;
public <prevpage> =     Page Up                      {prevpage}
                      | Previous Page                {prevpage};
public <nextpage> =     Page Down                    {nextpage}
                      | Next Page                    {nextpage};
<reading> = (talking | speaking | reading);
public <startspeech> = (Start | Begin) <reading>     {startspeech};
public <stopspeech> = Stop <reading> | Shut up       {stopspeech};
public <openbook> =     Open [another | new |        {openbook}
                        a new] book | Change [books |
                        book] | New book             {openbook};
public <find> =         Find (a word | a passage |   {find}
                        a phrase) | Search the (page |  {find};
                        document | chapter)
```

Once a grammar is built, it can be dynamically enabled or disabled, as can individual rules. This makes it possible to use different grammars in different contexts. For instance, the main viewer and the book chooser use different grammars, each of which contains navigation commands appropriate to the context. For example, the main grammar contains commands such as "next page" and "begin recording" that would be inappropriate in the chooser. Similarly, when the user begins dictating a text note, the full ViaVoice grammar is enabled (since the note is free-form text) while all rules in the restricted grammar are disabled, except for the rule used to stop recording.

In addition to the method to load a grammar from a file, the JSAPI provides methods to add rules programmatically, one by one. The present system uses this method when the book chooser is activated. More particularly, after parsing the metadata of all the available books, the system not only displays the title and author in the chooser, but also adds a rule to the grammar for each title. Thus, the user can select a book by saying the title without the system having to switch into general recognition mode with its inherent loss of precision.

In addition to speech recognition facilities, the Java Speech API 92 also provides text-to-speech facilities, encapsulated in the class javax.speech.synthesis.Synthesizer. The basic synthesis routines are very simple. The principle method used is speak, which takes a string to be spoken. For brief prompts and responses simply calling this method is adequate. However, when reciting the contents of the book, using this direct approach might introduce problems. Specifically, if speech is initiated in the same thread as the main viewer, the system will not respond to any commands, spoken or clicked, while it is speaking. Accordingly, to enable the user to issue commands during synthesis, the synthesizer is in a separate thread implemented in the Dictation class 96. When this thread is created, it is provided with the text content of the current page as seen on the screen, extracted from the active JEditorPane. When the entire page has been dictated, unless stopped by user command, the dictation thread will direct the abstract interface 28 to advance the viewer to the next page, retrieve the text for that page, and continue speaking.

Because of the structure of the Synthesizer interface, when the user issues a command to stop speaking, and then prompts the system to begin speaking without first changing pages or chapters, the synthesizer is paused and the dictation thread containing it is placed in a state that will not cause it to die. When the user directs the system to begin speaking again, if the page has not changed, the dictation thread simply resumes the paused synthesizer. In contrast, if the user changes pages or chapters while the system is speaking a page, the synthesizer is paused, all data on the speech queue is flushed to storage, and the dictation thread is directed to exit. A new speech thread is then created with the new data placed in its queue. If a navigation command is issued while speaking is paused, then the same process is followed except that the new dictation thread remains paused at the end. Since in either case the speech has been paused at the point that the new dictation thread is started, it is necessary to keep track of whether that pause was user or system driven.

The present implementation of the JSAPI 92 recognizer returns the digitized audio stream as an AudioClip object. To implement this, the Java Media Framework (JMF) is used directly. This library provides classes that manipulate many types of media data, including a straightforward framework to capture an audio stream and save it to disk. Using the JMF, however, means that only one object can take input from voice recognition device 20 at a time. It consequently is necessary to temporarily de-allocate ViaVoice while JMF objects capture the audio stream, and only then start a new recognizer. The present invention recognizes that alternatively, the Java Speech API could be rewritten to provide a method for acquiring the audio stream of a recognized passage in a format compatible with the JMF conversion and serialization routines, to allow for smooth interaction of the two APIs.

As disclosed above, a book chooser is used by the abstract interface 28 to select books from the storage 26. Such a book chooser is shown in FIG. 6 and designated 98. The book chooser 98 communicates with the storage 26, with outputs of both the parser 30 and annotation set 78 being rendered into XML for Java files 100.

While the particular ELECTRONIC BOOK WITH MULTIMODE I/O as herein shown and described in detail is fully capable of attaining the above-described objects of the invention, it is to be understood that it includes the presently preferred embodiments of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "steps for".

What is claimed is:

1. An electronic book device, comprising:
   a portable housing; and
   a processor in the housing and displaying content stored in a storage device by undertaking at least one of: responding to plural input modes, and outputting the content using plural output modes, wherein the processor responds to a graphics input mode by outputting content in a graphics output mode using a graphic user interface, the processor also responding to an audio input mode by outputting content in an audio output mode using an audio user interface.

2. The device of claim 1, wherein the plural output modes include at least visual graphics and sound, and the device includes at least one visual display and at least one audio speaker, both being responsive to the processor for outputting content.

3. The device of claim 2, wherein the processor is responsive to user input selecting an output mode.

4. The device of claim 1, wherein the plural input modes include at least graphics and sound, and the device includes at least one graphics input device and at least one audio input device, both sending input signals to the processor.

5. The device of claim 4, wherein the processor is responsive to user input selecting an input mode.

6. The device of claim 1, wherein the user interfaces run simultaneously with each other.

7. The device of claim 1, wherein die processor receives for storage annotations from a user-selected one of the user interfaces.

8. The device of claim 1, wherein the processor is programmed to allow a user to navigate through the content using a user-selected one of the user interfaces.

9. The device of claim 7, wherein the annotations are associated with user-selected portions of content.

10. The device of claim 1, wherein the processor receives for storage annotations from a user-selected one of the user interfaces and updates the other user interface with the annotations.

11. The device of claim 1, wherein the processor is programmed to allow a user to navigate through the content using a user-selected one of the user interfaces to render a navigation result, the processor updating the other user interface with the navigation result.

12. An electronic book, comprising:
content stored in at least one data storage;
at least one abstract interface accessing the data storage;
at least an audio user interface communicating with the abstract interface; and
at least one graphics user interface communicating with the abstract interface, the abstract interface receiving user input commands from the audio user interface and updating the graphics user interface in response thereto, the abstract interface receiving user input commands from the graphics user interface and updating the audio user interface in response thereto, wherein
the audio user interface and graphics user interface establish tangible interfaces, and for each tangible interface the abstract interface stores information including a current position in content being rendered and/or a spanning region of the content being rendered, such that first and second output threads are run simultaneously with each other, the abstract interface also determining positions at which tangible interfaces should pause when required to coordinate the multiple output modes.

13. The book of claim 12, wherein the book includes at least one visual display associated with the graphics user interface and at least one audio speaker associated with the audio user interface.

14. The book of claim 13, wherein content is output in a graphics output mode using the graphics user interface, content also being output in an audio output mode using the audio user interface.

15. The book of claim 14, wherein the user interfaces run simultaneously with each other.

16. The book of claim 14, wherein the annotations from a user-selected one of the user interfaces are stored in the book.

17. The book of claim 14, wherein a user navigates through the content using a user-selected one of the user interfaces.

18. The book of claim 16, wherein the annotations are associated with user-selected portions of content.

19. The book of claim 14, wherein the abstract interface updates one of the user interfaces in response to commands received from the other user interface.

* * * * *